Figure 1:
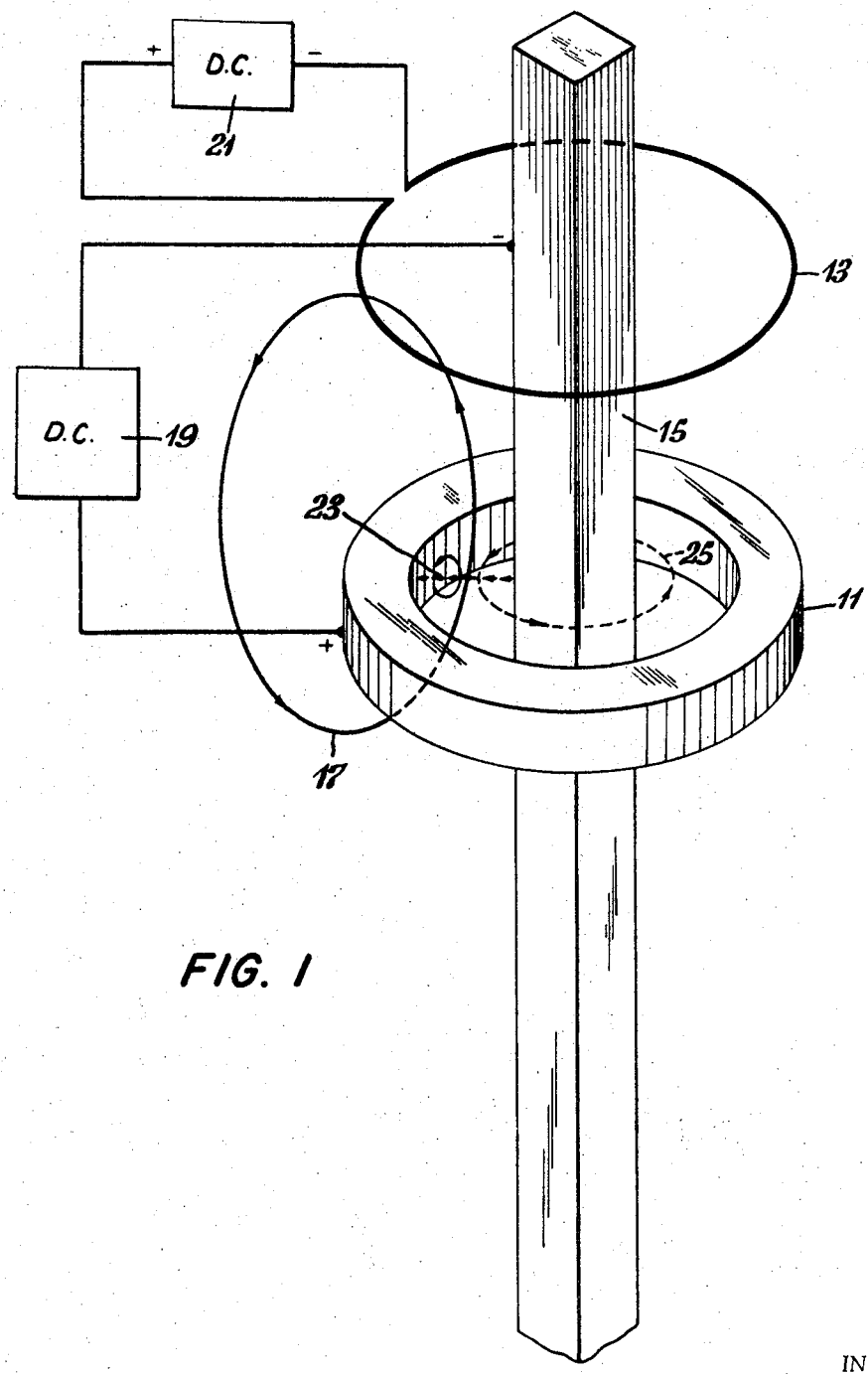

Nov. 14, 1967             T. E. BUTLER            3,352,997

METHOD OF REFINING SURFACE-CONTAMINATED METALS

Filed Feb. 9, 1965                         2 Sheets-Sheet 1

INVENTOR.
THOMAS E. BUTLER

BY

ATTORNEY

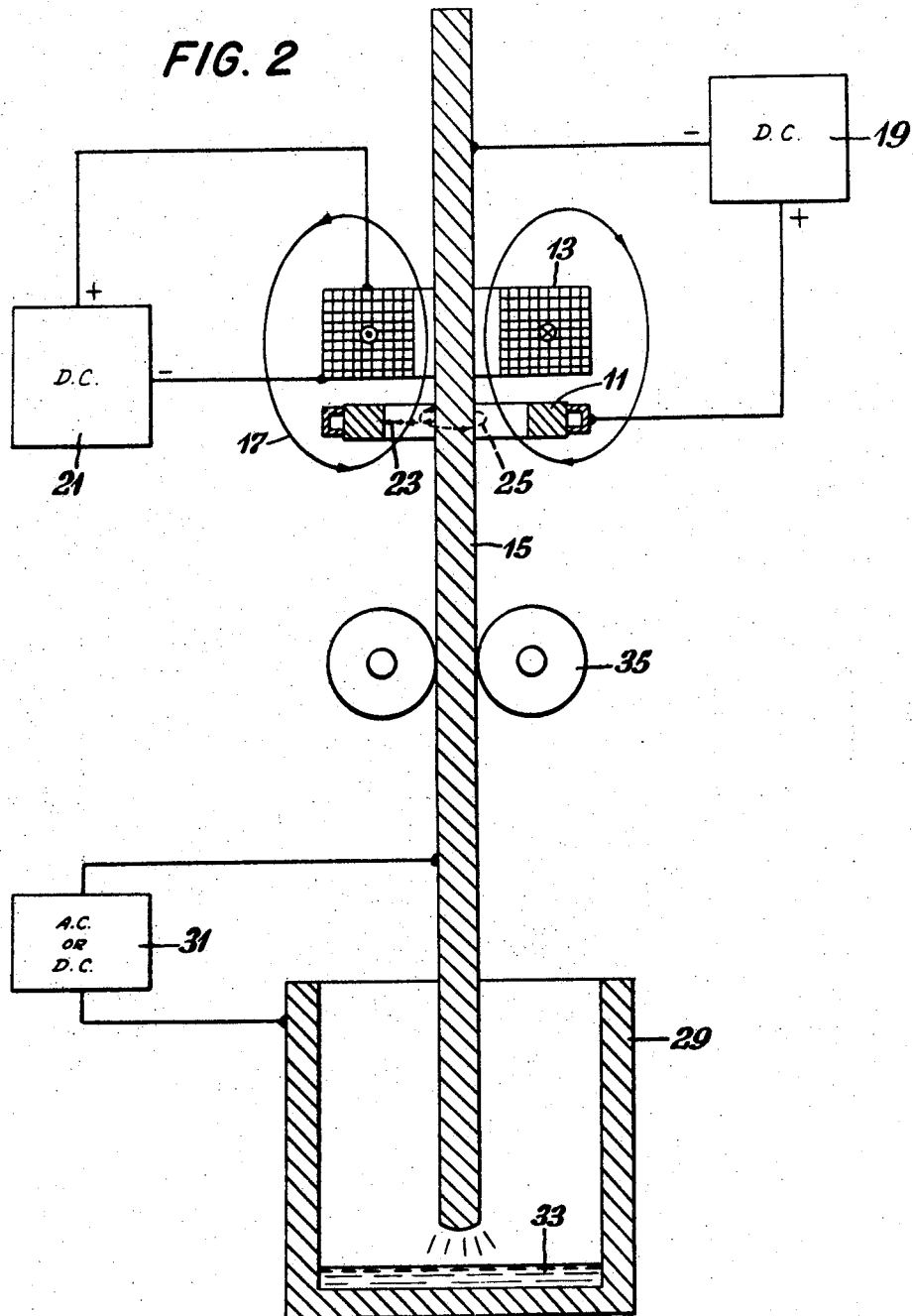

United States Patent Office 3,352,997
Patented Nov. 14, 1967

3,352,997
METHOD OF REFINING SURFACE-CONTAMINATED METALS
Thomas E. Butler, Chatham, N.J., assignor to Union Carbide Corporation, a corporation of New York
Filed Feb. 9, 1965, Ser. No. 431,272
3 Claims. (Cl. 219—123)

The present application is a continuation-in-part of application Ser. No. 197,464, filed May 24, 1962 and now abandoned.

The present invention pertains to a method of refining surface-contaminated metals and to an apparatus for use in the refinement of surface-contaminated metals. The invention, more particularly, is concerned with surface refining of metals by use of an electric arc.

Prior to the inception of the subject invention, cleaning, refining and preparation of metallic surfaces was accomplished by expensive, time-consuming processes including acid-pickling and numerous other liquid and solid chemical cleaner processes.

In consumable electrode arc melting, and in welding processes the electrodes are fabricated by various methods, such as pressing, casting, rolling, forging, drawing, etc., into suitable lengths and thicknesses and subsequently fed into a furnace where they are consumed in the heat of an arc initiated and maintained between the electrode and the molten bath. During the course of electrode fabrication, oil, grease, water vapor, and, probably most significant of all, oxygen and oxides, are readily picked up by the exposed surfaces of the electrodes. Additional contamination may also occur during storage of the electrodes or handling just before the electrodes are actually used in the melting equipment. Electrodes thus contaminated may be cleaned by mechanical means such as scraping, or by chemical means such as acid-pickling, just prior to use but, especially in the case of the reactive metals, subsequent exposure even for a short period of time to the atmosphere results in recontamination.

Moreover, studies of arc behavior in consumable and non-consumable electrode melting, both in arc casting and in electric arc welding and melting processes, have shown that the positional stability of the arc spot is strongly effected by electrode surface chemistry. The existence of surface impurities, particularly thin oxide films, present impurity areas of relatively low work function. This induces wander of the cathode spot from its normal position at the tip of the electrode to the various low work function areas. The affinity of the arc cathode spot for oxides is well known and, in view of the presence of oxide films on all metallic surfaces, such films represent probably the most influential type of common surface impurity and hence, one of the primary causes of arc instability.

Although other factors affect arc stability, as for instance current magnitude, arc length, pressure, feed rate, etc., such features represent operation variables which, in each particular case, are capable of correlation by an experienced furnace operator. No similar control, however, is possible with respect to arc cathode spot instability as a result of electrode surface contamination.

Further disadvantages also result during arc melting of electrodes having contaminated surfaces. For instance, surface evaporation of impurities has the additional effect of promoting a pressure rise in vacuum systems. In vacuum-melting processes, particularly at the low-micron or sub-micron pressure level, the operating characteristics of the arc may be pressure sensitive, and such pressure rises would undoubtedly be detrimental.

Electrode surface contamination also influences the ultimate purity of product being cast. The continuous liberation of impurities in the melting zone of any process is potentially detrimental from a metallurgical standpoint because of the strong possibility of these materials being absorbed by the molten pool.

Electrode surface chemistry in connection with arc stability, and the degree of purity attainable in arc-cast ingots, represent a phase of consumable electrode arc melting which has not previously received the degree of attention commensurate with its importance. The conditions enumerated above, which arise as a result of electrode surface contamination, clearly indicate that optimum arc-melting conditions cannot be achieved unless the electrode surfaces are substantially completely free of all foreign materials, particularly oxides.

An object of the present invention is to provide a novel and effective means by which surface-contaminated metals can be surface-refined.

Another object is to present a novel method of removing contaminating coatings from metal surfaces immediately prior to subsequent operations utilizing the metals.

A further object of the subject invention is to provide a method of removing contaminating surface substances from consumable electrodes so as to minimize the possibility of arc instability and ingot or weld contamination resulting from unfavorable surface chemistry.

A still further object is to provide a novel apparatus for use in surface-refining metals.

Other objects will be apparent from the subsequent disclosure and appended claims in conjunction with the drawing in which FIGURE 1 is a schematic illustration in perspective of an embodiment of the present invention and FIGURE 2 is a full vertical section of a preferred embodiment of the novel apparatus of the present invention.

The objects of the invention are achieved by applying a comparatively low-current, e.g. 5–20 ampere D.C. electric refining arc to the surface of a surface-contaminated metal. The metal surface to be cleaned is made a cathode and the arc is rapidly and systematically applied to the surface-contaminated metal, the application of the arc being such that there is essentially no melting of the metal surface being treated. In a preferred embodiment of the invention, the arc is propelled by a unidirectional magnetic field and high speeds of arc travel permit the use of higher cleaning arc currents, up to several hundred amperes, with no melting of the metal being treated.

It is essential in the practice of the present invention that the metal being treated be a cathode i.e., of negative polarity, in order that cleaning of the surface can be accomplished.

It has been found that when a surface contaminated metal is made a cathode, and an arc applied thereto, the oxide surface impurities will support the arc even at relatively low current values e.g. 5 to 20 amperes at 22 to 30 volts. Moreover, even such relatively low arc currents are sufficient to cause the oxide to be dissociated and completely removed from the surface. Consequently, by maintaining the metal as the cathode, impurities can be removed at comparatively low cost in view of the relatively small arc currents which can be effectively used. Also, since melting of the metal surface is avoided, the structure and strength of the article being cleaned is unaffected by the cleaning operation.

On the other hand, however, if the metal surface to be cleaned is made anodic, i.e. connected to the positive terminal cleaning via the arc mechanism described is not obtained and it is only when large arc currents are used and the surface is melted that impurity inclusions are "floated" out. These "floated" impurities are not dissociated and expelled from the metal, as when the surface is cathodic, and must be otherwise disposed of.

Apparatus provided for surface-refining of surface-contaminated metals in accordance with the present invention comprises an electrode girdle and a magnetic-fieldinducing girdle wherein the electrode girdle is positioned surrounding and out of contact with a surface-contaminated metal object extending through the apertures of the electrode girdle, the electrode girdle and metal object being separated by an arc sustaining medium; supporting means for the electrode girdle and the magnetic-field-inducing girdle; means for actuating the surface-contaminated metal through the aligned apertures of the electrode girdle and the magnetic-field-inducing girdle; a comparatively low current first D.C. power source with its negative terminal electrically connected to the surface-contaminated metal and its positive terminal connected to the electrode girdle; and a second D.C. power source electrically connected in circuit with the magnetic-field-inducing girdle. The magnetic-field-inducing girdle is positioned in magnetic-field linkage with the electrode girdle such that the apertures of the electrode girdle and the magnetic-field-inducing girdle are substantially disposed in alignment with each other.

In the process for surface refining surface-contaminated metals, a comparatively low-current D.C. electric arc is maintained between the inner boundary of the electrode girdle, and the surface-contaminated metal, by connection of the first D.C. power source in circuit with the electrode girdle and the surface-contaminated metal electrode, the surface-contaminated metal being a cathode and the electrode girdle an anode. The second D.C. power source electrically connected in circuit with the magnetic-field-inducing girdle causes the emanation of magnetic-field flux from the magnetic-field-inducing girdle which flux links the flux of the electric-refining-arc. The interaction of the flux lines of the magnetic-field-inducing girdle and the flux of the refining arc plasma causes the refining arc to circumvolve about the surface-contaminated metal; the refining arc being constantly maintained between the inner boundary of the electrode girdle and the surface-contaminated electrode. Simultaneously the surface-contaminated electrode is actuated to cause the passage thereof through the aperture of the magnetic-field-inducing girdle electrode girdle and eventually the aperture of the electrode girdle.

The continuous application of the circumvolving refining arc to the surface-contaminated metal in combination with the movement of the surface-contaminated metal through the aperture of the electrode girdle causes systematic application of the refining-arc to the entire surface of the surface-contaminated metal electrode whereby the cathodic behavior of the refining arc cause the surface contaminants to be stripped from the surface-contaminated metal with essentially no melting of the metal surface.

A more preferable form of the apparatus comprises an electrode girdle having an annular aperture and a magnetic-field-inducing girdle having an annular aperture wherein the electrode girdle is positioned surrounding and out of contact with a surface-contaminated metal object extending through the aperture of the electrode girdle. The magnetic-field-inducing girdle is positioned in close proximity and in magnetic-field linkage with the electrode girdle and such that the annular apertures of the electrode girdle and the magnetic-field-inducing girdle are disposed in close alignment with each other. Means supporting the girdles, means actuating the surface-contaminated metal, and power supplied in accordance with that described in the general apparatus above are also employed.

Referring to FIGURES 1 and 2, the apparatus comprises a conductive electrode girdle 11 which may be fluid cooled and a circular, magnetic-field-inducing coil 13. The electrode girdle 11 is positioned encircling and out of contact with a surface-contaminated metal object 15 extending through the aperture of the electrode girdle and along the vertical axis thereof. The circular magnetic-field-inducing coil 13 is positioned with its vertical axis coincident with the vertical axis of the electrode girdle 11 and in magnetic flux linkage 17 with the electrode girdle and in close proximity thereto. Roller means for actuating the surface-contaminated metal through the aperture of girdle 11 and magnetic-field-inducing coil 13, are also provided, and first D.C. power source 19 and a second D.C. power source 21 are connected in the manner previously described.

A preferred process comprises applying a comparatively low-current, D.C. electric refining arc 23 systematically and continuously to the surface of the surface-contaminated metal 15 by interacting a controlling, D.C. induced magnetic field 17 with the flux developed by the electric refining arc plasma 23. The direction of the flux lines of the controlling D.C. magnetic field 17 are preferably perpendicular to the direction of the flow of the refining arc plasma 23. The aforedescribed arrangement causes rotation of the refining arc, indicated as dotted lines 25, about the vertical axis of the controlling magnetic field 17 in a plane perpendicular to the vertical axis of the controlling magnetic field.

In the drawing, as shown, the first power source 19 has been electrically connected in circuit with the electrode girdle 11 and the surface-contaminated metal electrode 15 with the polarity required to render the electrode girdle anodic and the contaminated metal 15 cathodic.

The direction of current flow in the magnetic-field-inducing coil, and hence the direction of rotation of the refining arc, can be reversed by reversing the polarity of the second D.C. power source 21.

Although the herein disclosed apparatus and process are applicable to surface refining of a wide variety of surface-contaminated metal articles, the preferred embodiment is that shown in FIGURE 2.

FIGURE 2 is a full vertical section of an embodiment of the novel apparatus of this invention in conjunction with a consumable-electrode arc melting organization.

Referring now particularly to FIGURE 2 an arc melting arrangement is shown which comprises a surface-contaminated consumable electrode 15 positioned over and above a crucible 29. High current electrical power source 31 is electrically connected between the crucible 29 and the electrode 15. Application of electric power via the power source 31 causes an arc to be initiated and maintained between the surface-contaminated consumable electrode 15 and initially the crucible 29 and later the molten bath 33 of metal formed by the arc melting of consumable electrode 15.

The apparatus of the present invention comprises electrode girdle 11 positioned encircling and out of contact with the surface-contaminated consumable electrode 15. Circular, magnetic-field-inducing coil 13 is positioned encircling and out of contact with consumable electrode 15 and in magnetic-field linkage 17 with the electrode girdle 11 which is shown to be fluid cooled. A first, comparatively, low current D.C. power source 19 is connected with its positive pole at electrode girdle 11 and its negative pole at consumable electrode 15. Application of the first D.C. power source 19 causes refining arc 23 to be initiated and maintained between anodic electrode girdle 11 and cathodic consumable electrode 15. A second D.C. power source 21 is electrically connected as shown so as to produce magnetic-field linkage 17 with refining arc 23. The interaction between magnetic-field 17 and the flux of the refining arc 23 causes revolution of the refining arc about the central axis of magnetic field 17 and consequently about the central axis of consumable electrode 15. Consumable electrode 15 is actuated in downward passage through the apertures of the electrode girdle 11 and the magnetic-field-inducing coil 13 by rolls 35.

The motion of the refining arc 23 over the surface of the contaminated metal causes surface impurities to be dissociated and stripped from the surface of the metal.

Due to the low arc current and rapid motion of the refining arc there is essentially no melting of the surface being refined and the surface of the refined article is similar in texture to a lightly sand-blasted surface.

The use of the present invention to refine electrodes prior to use minimizes the possibility of arc-wander due to the selective probing of the arc plasma from areas of the electrode having lower work functions due to the presence of impurities. After the electrodes are treated by the present process in the hereinabove described apparatus, stable arcs can be struck between the electrode and a molten bath or another electrode without erratic wander due to the presence of surface impurities.

In addition, the use of the present invention will enable an artisan to directly melt consumable electrodes without contamination of the final ingot with oxides and other surface contaminants which are formed on the surface during fabrication of the raw electrode.

The present invention thus represents an efficient and practical method for eliminating impurities from the surface of a consumable electrode, as a result of which, arc instability arising from the said impurities is virtually eliminated. It should be noted that the type of circuit employed in generation of the melting arc in consumable or non-consumable electrode processes does not affect the circuiting of the present invention.

The invention further represents an electrode refining technique wherein the formation of interim compounds between the time of purifying and time of melting is prevented since it is a simple matter to withdraw the dissociated and volatilized impurities from the furnace and thus prevent contact with the molten pool. The devices necessary to carry out the invention are of such a nature and of such simple construction, that they are readily adaptable to most present equipment by minor modifications.

The method herein described further represents a means that is readily controllable and one which can be operated with ease to combat varying degrees of contamination.

The subject invention is applicable also to consumable-wire electrode welding. Such wires are similarly prone to oxidation and other contaminating influences. It is necessary merely to modify the welding head to permit exposure of the electrode to the cleaning arc prior to melting.

Another application would include surface refining of sheet and plate stock by traversing the surface at high speeds with a cleaning arc thus removing oxide films acquired during fabrication and thereby rendering the surface clean for subsequent cladding or coating operations.

What is claimed is:

1. A method for cleaning a surface-contaminated metal article which comprises:
    (1) arranging the article to be cleaned in circuit with an electrode and a source of direct current, the article to be cleaned being connected as a cathode and the electrode being connected as an anode
    (2) establishing an arc between the electrode and surface-contaminated metal article and
    (3) moving the arc over the surface of the metal article while continuously moving said metal article relative to said electrode to thereby remove impurities therefrom without causing melting at the surface of the metal article.

2. A method in accordance with claim 1 for cleaning cylindrically shaped metal articles wherein the arc is moved over the surface of the metal article by being rotated about the central axis thereof.

3. Apparatus for arc-refining and melting surface-contaminated metals comprising an electrode girdle and a magnetic-field-inducing girdle, said electrode girdle being positioned surrounding and out of contact with a surface-contaminated metal object extending through the aperture of said electrode girdle and being separated therefrom by an arc sustaining medium to permit the establishment of an arc between the mutually opposed surfaces of said electrode girdle and said metal object, said magnetic-field-inducing girdle being positioned in magnetic field linkage with said electrode girdle and said aperture of said electrode girdle and the aperture of said magnetic-field-inducing girdle being disposed substantially in alignment with each other; supporting means for said electrode girdle and said magnetic-field-inducing girdle; means for actuating the surface-contaminated metal object through the said aligned apertures of said girdles; a comparatively low current first D.C. power source electrically connected in circuit with said electrode girdle and said surface-contaminated metal object to provide an arc therebetween, said metal object being connected as a cathode and the electrode girdle as an anode; a second D.C. power source electrically connected in circuit with said magnetic-field-inducing girdle to provide rotation of the arc about the metal object; a crucible arranged to receive the metal object after its passage through the magnetic-field-inducing girdle and electrode girdle; feeding means adapted to advance the metal objects into the crucible; a third electric power source connected in circuit with the metal object and crucible to provide arc melting of the metal object in the crucible, said first, second and third power sources being arranged such that cleaning of the metal object and the melting thereof in the crucible occurs simultaneously.

References Cited

UNITED STATES PATENTS

| | | | |
|---|---|---|---|
| 501,825 | 7/1893 | Coffin | 219—123 |
| 2,125,172 | 7/1938 | Kinzel | 219—69 X |
| 2,216,564 | 10/1940 | Chapman | 219—136 |
| 2,472,851 | 6/1949 | Landis et al. | 219—123 X |
| 2,931,889 | 4/1960 | Lingafelter | 219—123 |
| 3,050,616 | 8/1962 | Gage | 219—69 |
| 3,068,352 | 12/1962 | Correy | 219—137 |
| 3,146,336 | 8/1964 | Whitacre | 219—121 |

JOSEPH V. TRUHE, *Primary Examiner.*

UNITED STATES PATENT OFFICE
CERTIFICATE OF CORRECTION

Patent No. 3,352,997                      November 14, 1967

Thomas E. Butler

It is hereby certified that error appears in the above numbered patent requiring correction and that the said Letters Patent should read as corrected below.

Column 6, lines 2 and 3, strike out "while continuously moving said metal article relative to said electrode".

Signed and sealed this 10th day of December 1968.

(SEAL)
Attest:

Edward M. Fletcher, Jr.                      EDWARD J. BRENNER
Attesting Officer                             Commissioner of Patents